United States Patent [19]

Tokugawa

[11] Patent Number: 5,066,043

[45] Date of Patent: Nov. 19, 1991

[54] ADJUSTABLE SHOULDER ANCHORAGE

[75] Inventor: Osamu Tokugawa, Fujisawa, Japan

[73] Assignee: Nippon Seiko Kabushiki Kaisha, Tokyo, Japan

[21] Appl. No.: 557,002

[22] Filed: Jul. 25, 1990

[30] Foreign Application Priority Data

Jul. 25, 1989 [JP] Japan .................. 1-87209[U]

[51] Int. Cl.$^5$ .................. B60R 22/20; B60R 22/24
[52] U.S. Cl. ...................... 280/808; 297/483; 297/486
[58] Field of Search .................. 280/801, 802, 808; 297/468, 473, 483, 486

[56] References Cited

U.S. PATENT DOCUMENTS

| 4,345,781 | 8/1982 | Suzuki et al. | 297/468 X |
| 4,508,363 | 4/1985 | Temple | 297/468 X |
| 4,536,011 | 8/1985 | Ono | 280/808 |
| 4,571,001 | 2/1986 | Hakansson | 297/468 X |
| 4,720,147 | 1/1988 | Takada | 297/486 X |
| 4,861,071 | 8/1989 | Takada | 297/483 X |

FOREIGN PATENT DOCUMENTS 62-82861 5/1987 Japan .
63-110153 7/1988 Japan .

Primary Examiner—Charles A. Marmor
Assistant Examiner—Tamara L. Finlay
Attorney, Agent, or Firm—Wegner, Cantor, Mueller & Player

[57] ABSTRACT

An adjustable shoulder anchorage is provided for use in a vehicle seat belt system. The anchorage includes a base defining a plurality of engagement portions distributed at predetermined intervals along the length of the base; a slide anchor provided movably under guidance along the base and carrying a joint on which a webbing is supported; a lock member provided on the slide anchor, the lock member being selectively engageable with the engagement portions; a stopper provided on a side of one end of the base so that movement of the slide anchor can be limited; and an impact absorber interposed between the stopper and the slide anchor, the impact absorber being flexible when brought into abutment against the stopper.

7 Claims, 4 Drawing Sheets

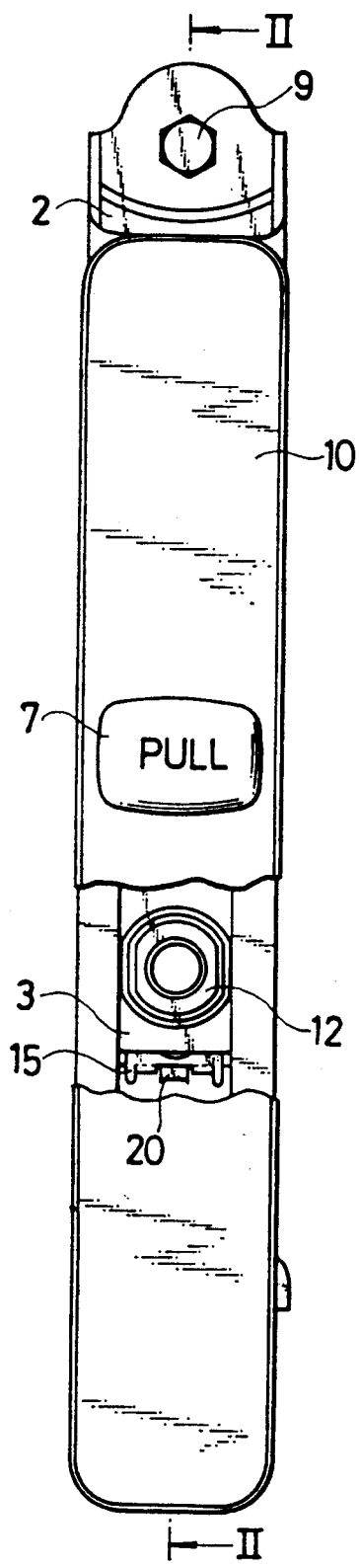
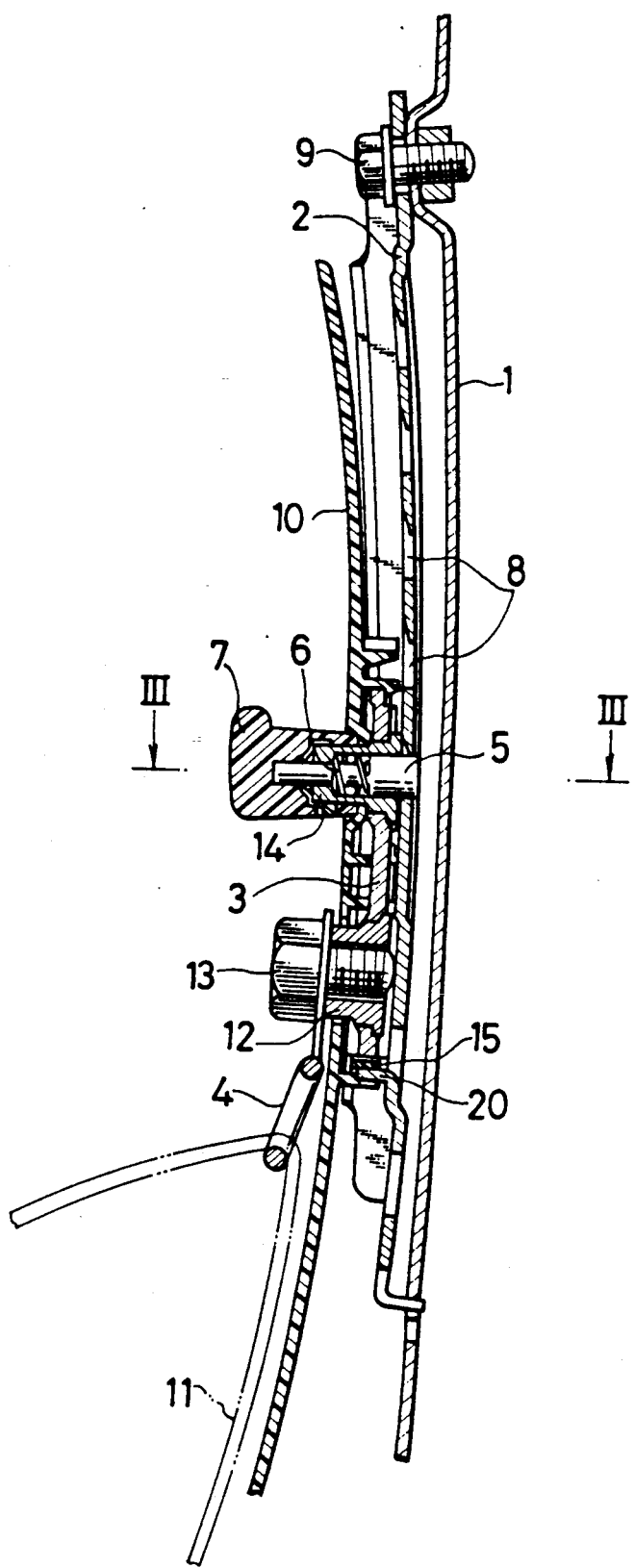

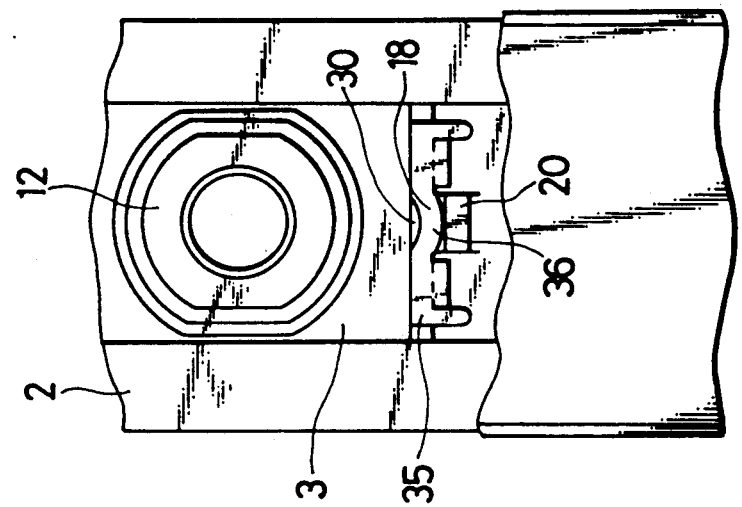
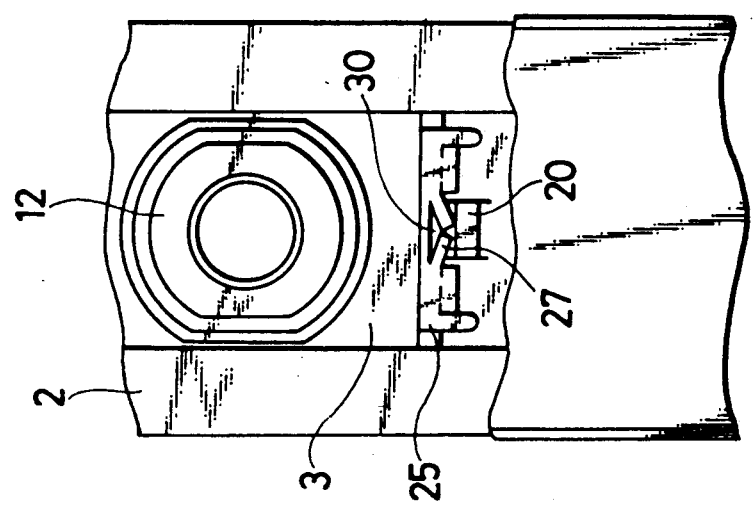

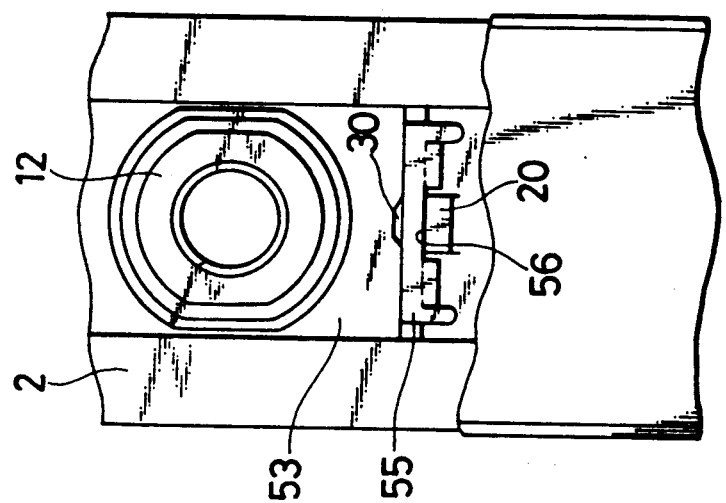
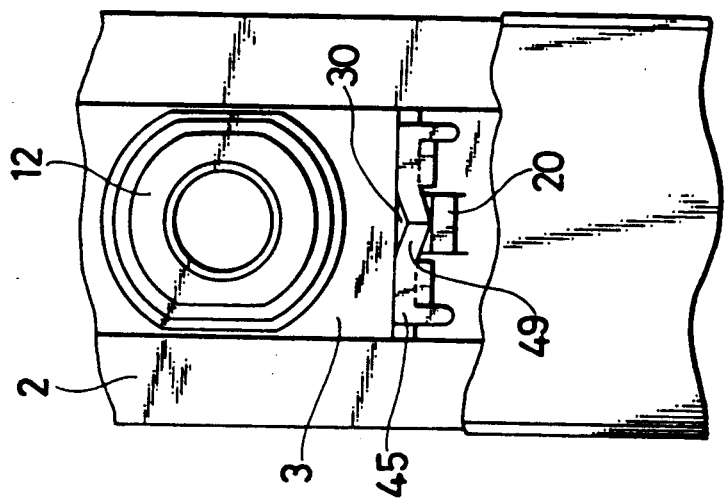

ADJUSTABLE SHOULDER ANCHORAGE

BACKGROUND OF THE INVENTION

1) Field of the Invention

The present invention relates to an adjustable shoulder anchorage which allows to adjust the height of a shoulder webbing of a seat belt system to be mounted on an automotive vehicle or the like.

2) Description of the Related Art

Seat belt systems for automotive vehicles include those equipped with an adjustable shoulder anchorage mechanism for holding a slide anchor carrying a joint, on which a webbing is supported, in such a way that the vertical position of the slide anchor can be adjusted to permit proper application of the webbing to the shoulder of an occupant in accordance with the sitting height and physical constitution of the occupant.

One example of such adjustable shoulder anchorages will be described with reference to FIGS. 1 and 2, which also illustrate a first embodiment of the present invention.

A base 2 is mounted on a vehicle body 1 by a bolt 9. A slide anchor 3 carrying a slip joint 4 through which a webbing 11 extends is guided by the base 2 movably in the vertical direction as viewed in FIG. 2. The webbing 11 is therefore supported by the slip joint 4. The slide anchor 3 is provided with a lock pin 5, which is selectively allowed to engage a desired one of plural engagement holes 8 bored through the base 2 so that the slide anchor 3 is locked on the base 2.

The lock pin 5 is urged by a spring 6 toward the vehicle body, whereby its engagement with the desired one of engagement holes 8 is maintained. The anchor 3 can be unlocked from the base 2 by pulling out the lock pin 5 with a knob 7 attached to the lock pin 5 on a side opposite to the vehicle body 1.

FIGS. 1 and 2 also illustrate a cover 10, nut 12 and bolt 13 for mounting the slip joint 4 o the slide anchor 3, and a pin guide 14 fixed on the slide anchor 3 to guide the lock pin 5.

When it is desired to change the height of the slip joint 4 with the webbing 11 extending therethrough and supported thereby, it is only necessary to pull the knob 7 in an inboard direction until the lock pin 5 is pulled out of the engagement hole 8, to move the slide anchor 3 upwardly or downwardly along the base 2, and then to release the knob 7 at a position corresponding to the engagement hole 8 at an optimal height so that the lock pin 5 can be inserted in and held by the engagement hole 8 owing to the force of the spring 6.

To move the slide anchor 3 to the lowest height, a stopper 20 is generally employed to prevent the slide anchor 3 from moving down beyond a certain distance. The stopper 20 is formed by lancing and bending up a portion of the base or by using a separate member. A resin-made slide shoe 15 fixed on an end portion of the slide anchor 3 in order to permit smooth movement of the slide anchor 3 is brought into abutment against the stopper 20, whereby any further downward movement of the slide anchor 3 is prevented.

As has been described above, a slide shoe fixed on an end portion of a slide anchor is designed to abut against a stopper portion of a base so that the stopper portion and the slide anchor, both made of a metal, are prevented from abutment.

In a construction such that a slide shoe is simply fixed on a slide anchor as described above, it is impossible to sufficiently absorb an impact by the slide anchor at the lowest position thereof so that an impact noise is produced.

SUMMARY OF THE INVENTION

To overcome the problems described above, the present invention provides an adjustable shoulder anchorage which comprises a base defining a plurality of engagement portions distributed at predetermined intervals along the length of the base, a slide anchor provided movably under guidance along the base and carrying a joint on which a webbing is supported, a lock member provided on the slide anchor, the lock member being selectively engageable with the engagement portions, a stopper provided on a side of one end of the base so that movement of the slide anchor can be limited, and an impact absorber means interposed between the stopper and the slide anchor, the impact absorber means being flexible when brought into abutment against the stopper.

Owing to the provision of the impact absorber means between the stopper, which prevents any further downward movement of the slide anchor, and the slide anchor, the impact absorber means can absorb an impact when the slide anchor is moved to the lowest height. The occurrence of impact noise can therefore be reduced.

BRIEF DESCRIPTION OF THE DRAWINGS

FIG. 1 is front elevation of an adjustable shoulder anchorage according to a first embodiment of the invention;

FIG. 2 is an axial cross-sectional view taken in the direction of arrows II—II of FIG. 1;

FIG. 5 is an enlarged fragmentary view of an adjustable shoulder anchorage according to a second embodiment of the invention;

FIG. 6 is an enlarged fragmentary view of an adjustable shoulder anchorage according to a third embodiment of the invention;

FIG. 7 is an enlarged fragmentary view of an adjustable shoulder anchorage according to a fourth embodiment of the invention; and FIG. 8 is an enlarged fragmentary view of an adjustable shoulder anchorage according to a fifth embodiment of the invention.

DETAILED DESCRIPTION OF THE INVENTION AND PREFERRED EMBODIMENTS

Figure 3:
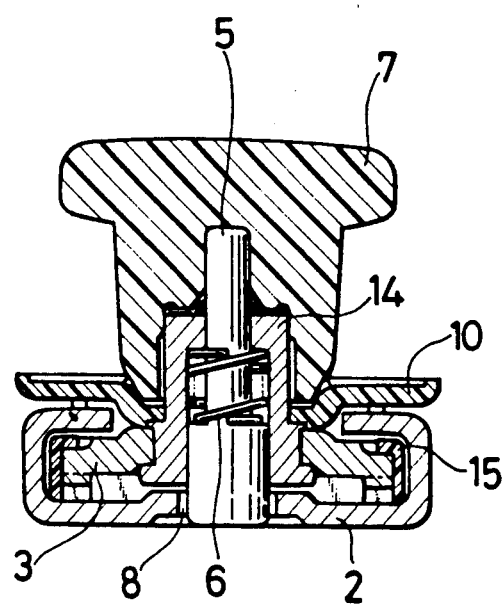
FIG. 3 is a transverse cross-sectional view taken in the direction of arrows III—III of FIG. 2.

Referring first to FIGS. 1 through 4, an adjustable shoulder anchorage according to a first embodiment of the invention will be described.

The outline of the anchorage has already been described above in the Description of the Related Art, so that details of the anchorage are omitted herein. Elements of structure, which relate to the present invention, will be described next.

To move the slide anchor 3 to the lowest height, the button 7 is pulled up leftwards as viewed in FIG. 2 so that the lock pin 5 is disengaged from the engagement hole 8. Once the engagement of the slide anchor 3 and the base 2 is released, the slide anchor 3 becomes movable. When the slide anchor 3 is moved downwards as viewed in the drawing, the slide shoe 15 provided on a lower end portion of the slide anchor 3 is brought into abutment against the stopper 20 provided on the base 2 so that the slide anchor 3 is prevented from any further downward movement.

Figure 4:
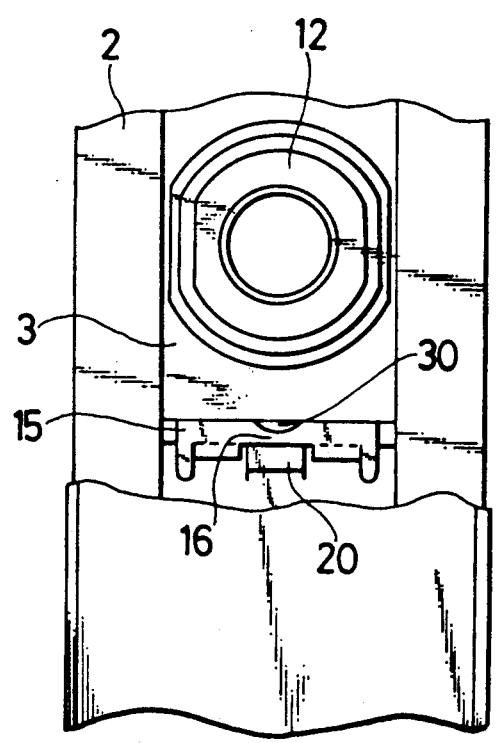
FIG. 4 is an enlarged view of a stopper and a slide anchor portion of the adjustable shoulder anchorage according to the first embodiment of the invention.

As is apparent from FIG. 4 in particular, an abutment 16 of the slide shoe 15, at which the slide shoe 15 is brought into abutment against the stopper 20, is formed thinner on the side of the slide anchor 3, whereby a spacing 30 is formed between the slide shoe 15 and an proximal end portion of the slide anchor 3. When an impact is applied to the slide shoe 15 as a result of downward movement of the slide anchor 3 and subsequent abutment of the slide shoe 15 against the stopper 20, the abutment 16 of the slide shoe 15 is allowed to flex upwardly so that an impact can be absorbed and the occurrence of impact noise is reduced.

An adjustable shoulder anchorage according to a second embodiment of the invention will next be described with reference to FIG. 5.

An abutment of a slide shoe 25, at which the slide shoe 25 is brought into abutment against the stopper 20, is lanced and bent up. Namely, lanced portions 27 having a thickness equal to substantially half the vertical thickness of the abutment are bent up toward the stopper 20 so that a spacing 30 is formed between the lanced portions 27 and the slide shoe 25.

When the slide anchor 3 is moved to the lowest position, the lanced portions 27 of the slide shoe 25 are brought into abutment against the stopper 20 on the base 2 so that the slide anchor 3 is stopped by the stopper 20. Here, the lanced portions 27 are caused to flex upwardly by the stopper 20. Therefore, an impact is absorbed and the occurrence of impact noise is reduced.

An adjustable shoulder anchorage according to a third embodiment of the invention will now be described with reference to FIG. 6.

An abutment 18 of a slide shoe 35, at which the slide shoe 35 is brought into abutment against the stopper 20, is formed as an arched portion 36 which bulges out toward the stopper 20. Namely, the abutment 18 of the slide shoe 35 is formed in an arcuate configuration so that the slide shoe 35 bulges out at the abutment 18 toward the stopper 20. By the arcuate configuration, a spacing 30 is formed between the arched portion 36 and a proximal end portion of the slide anchor 3.

When the slide anchor 3 is moved to the lowest position, the arched portion 36 of the slide shoe 35 is brought into abutment against the stopper 20 on the base 2 so that the slide anchor 3 is stopped by the stopper 20. Here, the arched portion 36 is caused to flex upwardly by the stopper 20. Therefore, an impact is absorbed and the occurrence of impact noise is reduced.

An adjustable shoulder anchorage according to a fourth embodiment of the invention will next be described with reference to FIG. 7.

An abutment of a slide shoe 45, at which the slide shoe 45 is brought into abutment against the stopper 20, is lanced and bent up. Namely, lanced portions 49 having a thickness equal to the vertical thickness of the abutment are bent up toward the stopper 20 so that a spacing 30 is formed between the lanced portions 49 and a proximal end portion of the slide anchor 3.

When the slide anchor 3 is moved to the lowest position, the lanced portions 49 of the slide shoe 45 are brought into abutment against the stopper 20 on the base 2 so that the slide anchor 3 is stopped by the stopper 20. Here, the lanced portions 49 are caused to flex upwardly by the stopper 20. Therefore, an impact is absorbed and the occurrence of impact noise is reduced.

An adjustable shoulder anchorage according to a fifth embodiment of the invention will now be described with reference to FIG. 8.

A lower end portion of a slide anchor 53 is cut off as an indentation, so that a spacing 30 is formed between the slide anchor 53 and a slide shoe 55.

Described specifically, the lower end portion of the slide anchor 53 is cut off at a location opposing to an abutment 56 of the slide shoe 55, at which abutment 56 the slide shoe 55 is brought into abutment against the stopper 20, whereby the spacing 30 is formed between the slide shoe 55 and the slide anchor 53.

When the slide anchor 53 is moved to the lowest position, the abutment 56 of the slide shoe 55 is brought into abutment against the stopper 20 on the base 2 so that the slide anchor 53 is stopped by the stopper 20. Here, the abutment 56 of the slide shoe 55 is caused to flex upwardly by the stopper 20. Therefore, an impact is absorbed and the occurrence of impact noise is reduced.

I claim:

1. An adjustable shoulder anchorage comprising:
   a base defining a plurality of engagement portions distributed at predetermined intervals along the length of said base;
   a slide anchor provided movably under guidance along said base and carrying a joint on which a webbing is supported;
   a lock member provided on said slide anchor, said lock member being selectively engageable with said engagement portions;
   a stopper provided on a side of one end of said base so that movement of said slide anchor can be limited; and
   impact absorber means interposed between said stopper and said slide anchor for reducing impact noise, wherein said impact absorber means is flexed when said slide anchor is brought into abutment against said stopper.

2. An adjustable shoulder anchorage comprising:
   a base defining a plurality of engagement portions distributed at predetermined intervals along the length of said base;
   a slide anchor provided movably under guidance along said base and carrying a joint on which a webbing is supported;
   a lock member provided on said slide anchor, said lock member being selectively engageable with said engagement portions;
   a stopper provided on a side of one end of said base so that movement of said slide anchor can be limited; and
   an impact absorber means interposed between said stopper and said slide anchor, said impact absorber means being flexible when brought into abutment against said stopper;
   wherein said impact absorber means has a slide shoe provided on said slide anchor at a location facing said stopper and said slide shoe is flexible when brought into abutment at an abutment thereof against said stopper.

3. The anchorage of claim 2, wherein said abutment of said slide shoe has a thin-walled portion so that a spacing is formed on a side of said slide anchor.

4. The anchorage of claim 2, wherein said abutment of said slide shoe has a lanced portion bent up toward said stopper.

5. The anchorage of claim 4, wherein said lanced portion has been formed by lancing and bending up substantially half the thickness of said slide shoe.

6. The anchorage of claim 2, wherein said abutment of said slide shoe has an arched portion bulged toward said stopper.

7. An adjustable shoulder anchorage comprising:
   a base defining a plurality of engagement portions distributed at predetermined intervals along the length of said base;
   a slide anchor provided movably under guidance along said base and carrying a joint on which a webbing is supported;
   a lock member provided on said slide anchor, said lock member being selectively engageable with said engagement portions;
   a stopper provided on a side of one end of said base so that movement of said slide anchor can be limited; and
   an impact absorber means interposed between said stopper and said slide anchor, said impact absorber means being flexible when brought into abutment against said stopper;
   wherein a flexible slide shoe is provided on a portion of said slide anchor, said portion being on a side of said stopper; said slide anchor defines an indentation in said portion at a location opposing to said stopper, whereby a spacing is defined between said slide anchor and said slide shoe to allow said slide shoe to flex toward said slide anchor upon abutment of said slide shoe against said stopper.

* * * * *